Dec. 12, 1933.    R. T. PHIPPS    1,939,461
SPRAYER
Filed July 31, 1931

INVENTOR.
Ross T. Phipps
BY
ATTORNEY.

Patented Dec. 12, 1933

1,939,461

UNITED STATES PATENT OFFICE 1,939,461

SPRAYER

Ross T. Phipps, Bridgeport, Conn.

Application July 31, 1931. Serial No. 554,217

3 Claims. (Cl. 299—65)

This invention is broadly applicable for the diffusion and sprinkling of liquids, but it is particularly designed as a lawn or garden sprayer.

It is among the objects of the invention to provide a novel and simple sprayer which is highly efficient in the distribution of water over large areas.

Another object is to provide a sprayer which is motivated by and as a result of passage of water through it so as to eliminate the necessity of any extraneous motive means.

Another object of the invention is to provide a sprayer which is of a minimum number of parts and which may, therefore, be manufactured and sold at extremely low cost.

A further object of the invention is to provide a sprayer, the action of which is novel and provides an interesting and decorative lawn piece.

Other objects of this invention will be apparent from a consideration of the specification taken in connection with the following drawing.

While the invention is susceptible to widely varying modifications of structure which may be utilized without departing from the spirit of the invention, one illustrative embodiment thereof consists of a base coupling piece adapted for attachment to a hose and which may be supported in any desirable manner, preferably in a vertical position as illustrated. The coupling piece is provided with a plurality of tubular extending elements to which are attached substantially long flexible tubes, preferably rubber; the ends of which are closed and adjacent the closure thereof each tube is provided with one or more small apertures. In the action of the device, water from the hose passes through the coupling and into the flexible tube and the pressure and flow of the liquid is caused to act upon the tubes to vigorously flex them back and forth and up and down so that their writhing action will cause the fine spray emitted therefrom to be directed in all directions so as to provide a highly diffused, wide spreading spray of sprinkling action.

Figure 1:
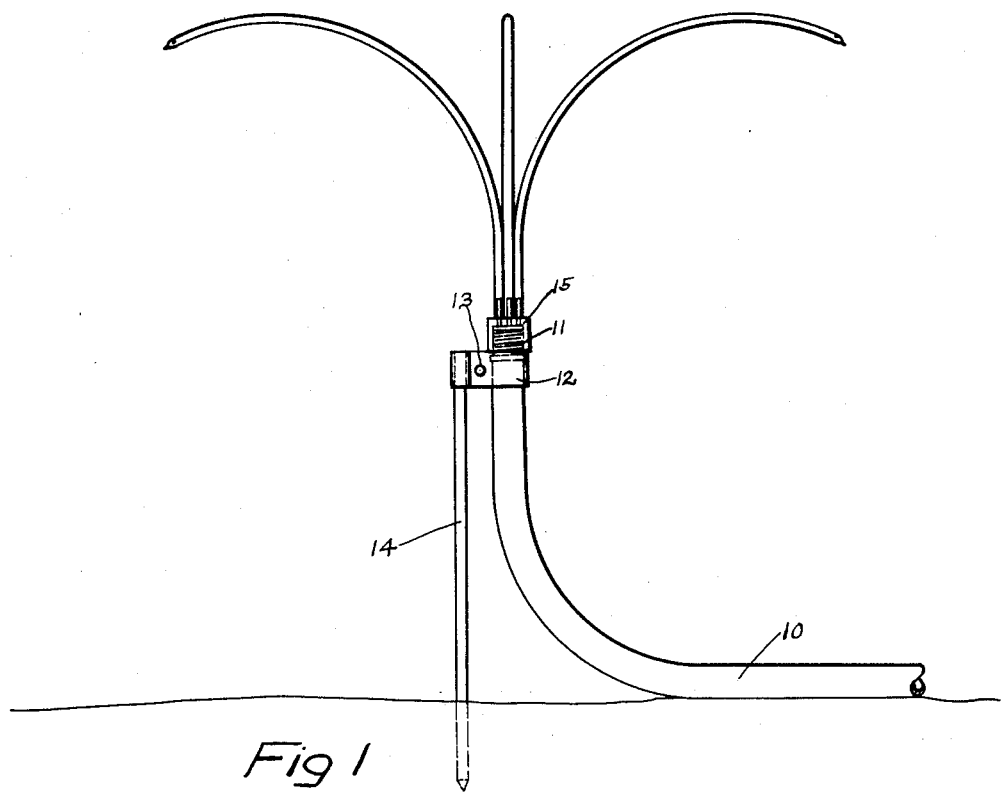
Fig. 1 is a side elevation of one embodiment of the invention.
Figure 2:
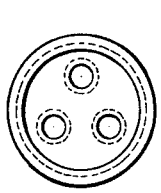
Fig. 2 is a bottom plan view of the base or coupling piece.

In the drawing, numeral 10 indicates a simple conventional garden hose, the end of which is provided with the conventional externally threaded connector indicated at 11 in Fig. 1. The outlet end of the hose is supported in a vertical position by a partially encircling band 12 which may be of conventional substantially U shape formation, the legs of the U being clamped about the end of the hose 10 by means of a securing screw 13. The band 12 is supported in elevated position as indicated by a suitable supporting rod 14. While the supporting structure is conventional, it may be substituted by equivalent support and while no invention is claimed for the support itself, it will be seen hereinafter that the particular type of band cooperates with the sprayer itself so as to prevent the slipping of the secured end of the hose with respect thereto.

The sprayer itself consists of an internally threaded coupling or base element 15 which is preferably externally knurled as illustrated so as to facilitate its attachment and removal from the coupling 11. The base 15 may be formed of various materials, but it has been found that a brass or other metallic fitting is particularly adaptable. The thickness of the side walls thereof provides for their extension beyond the outside walls of the hose so that its lower edge will rest upon the upper edge of the supporting band and will thus prevent displacement of the hose from the support.

Figure 3:
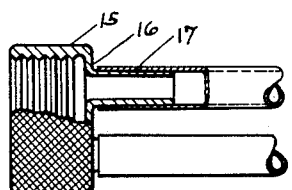
Fig. 3 is a detail side elevation partly in section of the base and the flexible spray tubes.
Figure 4:
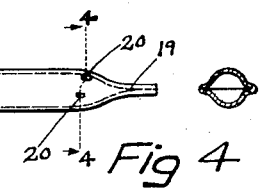
Fig. 4 is a sectional view of the tube taken on line 4—4 of Fig. 3.

The end of the base 15 is provided with a top or closure plate 16 from which extends a plurality of equally spaced small tubular connector extensions 17 which may be formed integral with the base as illustrated or which may be pressed into the closure of the base or otherwise attached thereto. The extension 17 constitutes a connecting piece for an equal plurality of substantially long highly flexible tubes 18. It will, of course, be understood that the tubes may be attached to the base in any equivalent fashion. The ends of the flexible tubes 18 are closed as at 19 by any desired means such as cement or if desired the tubes may be molded with the ends already closed. Experience has found that the closure of the tube by the uniting of the two side walls as indicated in Fig. 3 gives to the internal end of the tube a contour which lends itself to the action of the flowing fluid so as to vigorously flex the tube as a consequence of the flow. In conjunction with the contour of the hose the flexing of the tube further results from the passage of the water through a pair of small atomizing apertures 20. While various combinations and arrangements of apertures may be used, it is preferable to provide a pair of apertures adjacent the end of each tube, the apertures being spaced approximately 45 degrees apart and lying in different planes which planes are transverse the axis of the tube. As an illustration of this specific arrangement of the apertures, which arrangement taken in conjunction with the compressed ends of the tube provides for the effective writhing action thereof, the apertures may be formed by a single thrust of a piercing instrument, the piercing being made at an angle to the axis of the tube so that the apertures lie in spaced planes transverse of the tube and the thrust is made to one side of the axis of the tube so that the apertures lie at a radial angle of approximately 45 degrees. Thus a back pressure is built up which results in a tortuous, twisting, flexing and back-lashing of the tube, the natural resiliency of which adds to its waving motion.

From the foregoing description of the structure of the invention, it will be obvious that when water is directed through the hose to the sprayer, each tube individually acts in response to the flow of the fluid so as to flex and twist individually of the other tubes and thus to wave and spring back and forth whereby the water which is divided from a solid stream first at the base is sprayed through the small apertures 20 so as to emerge as a fine spray which is directed and further atomized by the vigorous movement of the tube.

From the foregoing it will be understood in connection with the drawing and description of the invention that the matter is presented in an illustrative rather than a restrictive sense and that changes, modifications and full use of equivalents may be resorted to in the manufacture of the device without departing from the spirit or scope of the claims.

Having thus set forth the nature of my invention, what I claim is:

1. A sprayer including a base, a plurality of flexible tubes carried thereby, each of said tubes having a sealed end and spaced apertures adjacent thereto, said apertures lying in a spaced angular relation circumferentially of the tube and in different parallel planes transverse of the tube.

2. A sprayer including a base, a plurality of long flexible tubes carried thereby and connecting therewith, each of said tubes having a sealed end and a plurality of spaced apertures adjacent thereto and arranged to flex the tube as the result of the passage of water therethrough, said apertures lying in a spaced circumferential relation of forty-five degrees and in different planes transverse of the tube.

3. In a sprayer, the combination with a base of an elongated flexible tube having its outer end closed by a joining of the tube walls and including adjacent its closed end a plurality of apertures which are spaced circumferentially of the tube and which lie in different planes transverse of the tube.

ROSS T. PHIPPS.